May 29, 1951 J. V. O'NEILL ET AL 2,554,877

CONTROL TUBE

Filed Oct. 29, 1949 2 Sheets-Sheet 1

INVENTORS
ROGER W. SLINKMAN
JAMES V. O'NEILL
BY J. Albert Hultquist
ATTORNEY

CONTROL TUBE

Filed Oct. 29, 1949 2 Sheets-Sheet 2

INVENTORS
ROGER W. SLINKMAN
JAMES V. O'NEILL
BY
J. Albert Hallquist
ATTORNEY

Patented May 29, 1951

2,554,877

UNITED STATES PATENT OFFICE 2,554,877

CONTROL TUBE

James V. O'Neill and Roger W. Slinkman, Emporium, Pa., assignors to Sylvania Electric Products Inc., a corporation of Massachusetts Application October 29, 1949, Serial No. 124,376

10 Claims. (Cl. 315—58)

Figure 1:
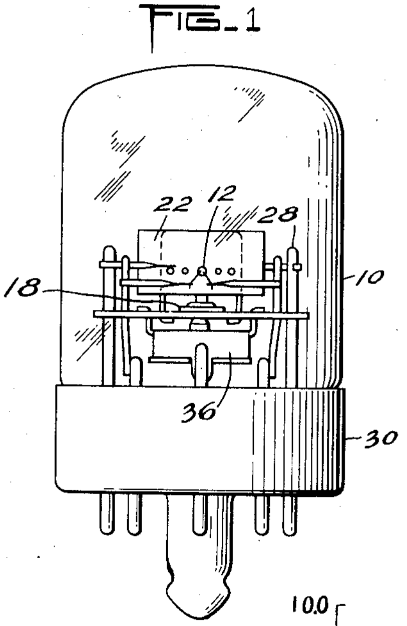

The present invention relates to electrical control devices for varying an electrical characteristic and more particularly to an electron discharge device in which a capacitance may be varied in accordance with variation in potential applied to a control electrode of the device.

An object of the present invention is to provide electrical control device for varying an electrical characteristic such as capacity in response to a control potential.

Another object of the present invention is the provision of a novel means for frequency control of a local oscillator of a superheterodyne receiver.

Still another object of the present invention is to provide a much greater tuning correction in a frequency control system in kilocycles per second per volt of control voltage than heretofore known.

Still a further object of the present invention is the provision of a system of tuning correction which does not lead down or restrict the oscillator performance of a superheterodyne receiver in any way.

Another object of the present invention is to provide the same ease of tuning of a radio receiver in the frequency modulation broadcast band as is now customarily enjoyed on the amplitude modulation broadcast band.

The foregoing objects and other which may appear from the following detailed description are obtained in accordance with an aspect of the present invention by providing an electrical control device having, within an evacuated envelope, at least a thermionically heated cathode, a control grid, and an anode. The anode is in the form of a resilient bimetallic strip having one end rigidly mounted and the remainder left free to flex. The bimetallic anode is thermionically heated by the cathode and flexes about its mounting in proportion to the degree of thermionic heating which is regulated by the potential applied to the control grid. A variable condenser included in the envelope is arranged so that its capacity is varied by the flexing of the bimetallic anode. The condenser is entirely separate from the anode electrically and includes a fixed plate or stator and a movable armature insulated from the stator by an interposed mica sheet. The armature of the variable condenser is normally biased toward the stator by a coiled spring. A one-way connection is provided between the bimetallic strip anode and the armature of the variable condenser so that as the bimetallic strip anode flexes in response to heat, the coil spring acting against the armature of the variable condenser presses the armature more closely toward the stator thereby increasing the capacity of the condenser. It will thus be seen that the movement of the condenser armature is confined within predetermined limits, but the bimetallic strip anode is free to flex upon thermionic heating to whatever extent is required. Preferably, an insulating member is included in the one-way connection to electrically isolate the condenser from the anode. A tetrode discharge tube structure may be used so that a larger change in plate current is secured for a relatively narrow range of variation in grid voltage.

Figure 2:
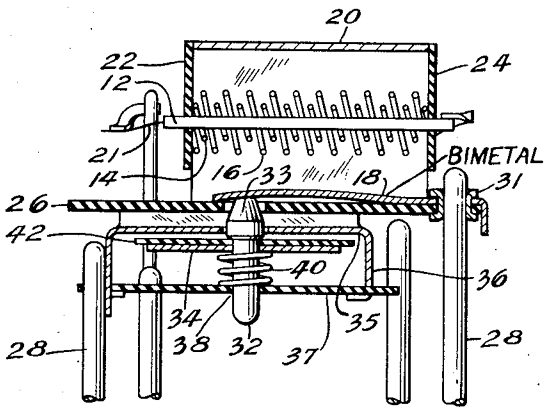
Figure 3:
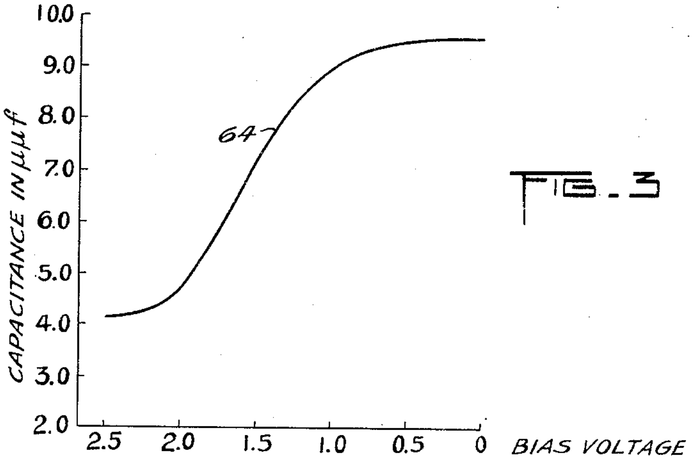
Figure 4:
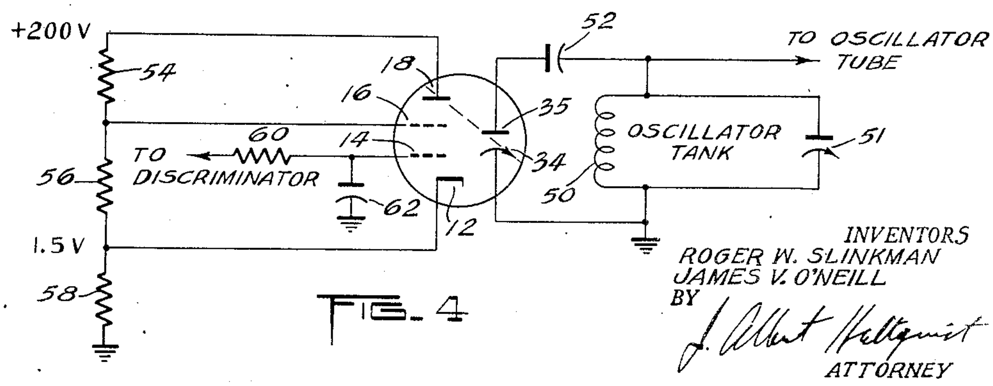

The present invention will be more fully understood by reference to the following detailed description which is accompanied by a drawing in which Fig. 1 illustrates in elevation, an embodiment of the present invention; while Fig. 2 is a transverse section of a portion of the tube shown in Fig. 1; Fig. 3 is a curve illustrating the variation of capacity obtained in the tube of Fig. 1 with a variation in control grid bias voltage; Fig. 4 is a circuit diagram illustrating the application of the tube of Fig. 1 to a local oscillator of a superheterodyne receiver; and Figs. 5, 6, 7 and 8 are families of curves illustrating the control characteristics of the tube of the present invention as compared with conventional reactance tube performance in an automatic frequency control superheterodyne receiver.

Referring now to Fig. 1, there is shown an evacuated vitreous casing 10 containing a thermionic discharge tube structure including a cathode 12, a control grid 14, a screen grid 16 and an anode 18 at least partly surrounded by a metal shield 20. The cathode 12 is preferably coated with an electron emissive material on its exterior surface and has within its hollow interior, a heater or filament 21 by means of which the cathode is heated so that it emits electrons. The grids 14 and 16, surrounding the cathode 12, are preferably maintained in their proper relative positions by mica spacers 22 and 24 having apertures therein through which the cathode 12 and side rods of the grids 14 and 16 pass. The assembly as so far described, is preferably mounted on a transverse mica sheet 26 which is supported in place within the evacuated casing 10 by being mounted near the upper ends of pins 28 passing through the glass header of the envelope 10. The pins 28 also serve as connector leads whereby the electrical elements within the tube are connected to appropriate circuit elements on the exterior of the tube. In order to secure the tube in a conventional lock-in socket, a base shell 30 is provided over the header of the tube. The base shell 30 and shield 20 serve to electrostatically shield the discharge structure from external influences.

Anode 18 is a bimetallic strip, so arranged as to flex towards the cathode 12 as it is heated. It is rigidly secured at one end as by means of an eyelet 31, to one of the base pins 28 and to the mica sheet 26. Mica sheet 26 has an aperture through which passes a rod 32 having one end in contact with the anode 18. The rod 32 of ceramic or other heat resistant insulating material is provided with a shoulder 33 against which bears the armature 34 of the variable condenser. The stator of the variable condenser includes a metal plate 35 having a central aperture through which the rod 32 passes and is secured in position by being welded or otherwise secured to certain of the lead-in pins 28. It may also have downwardly extending legs such as the one indicated at 36 which is clinched through a further mica sheet 37. Mica sheet 37 has an aperture 38 therethrough in alignment with the apertures in mica sheet 26 and stator 35 whereby the ceramic rod 32 is guided for endwise movement in responsive to the flexing of anode 18 and the pressure of spring 40 bearing against the armature 34. Preferably a mica spacer disc 42 is provided between the capacitor armature 34 and stator 35. Now, when the heater 21 is energized and a source of potential has its positive pole connected to the anode 18 and its negative pole connected to cathode 12 the stream of electrons from the cathode will strike the anode, heating it to an extent determined by the current carried by the stream. The heat developed causes the anode to bend toward the cathode, relaxing the pressure against push rod 32. Spring 40 therefore moves armature 34 nearer stator 35 increasing the capacity of the condenser. By varying the potential on grid 14 the effective capacity of the condenser may be varied. The limit of capacity increase occurs when armature 34 is pressed against stator 35 by the full pressure of spring 40. Further heating of anode strip 18 by an increase in anode current only lifts the anode strip away from push rod 32.

In order to increase the sensitivity of control action and decrease the effect of anode potential variations, screen grid 16 is provided connected through a suitable voltage divider network to the source of anode potential.

A typical control circuit is shown in Fig. 4. The tube and the elements within the tube which were above described have the same reference characters in Fig. 4 as in Figs. 1 and 2 so an additional description of these elements for Fig. 4 is not considered necessary. The variable capacitor element, that is, the stator 35 and armature 34 are connected directly across the tank circuit of an oscillator which may form a part of the converter circuit of a superheterodyne receiver. The tank circuit includes inductance 50 and tuning condenser 51. As indicated by the labelled arrow the tank circuit is coupled to an oscillator tube (not shown). A series padding condenser 52 may be provided if desired in the connection from the tank circuit to the control tube in order to more readily preset the total possible tuning effect of the control tube 10.

The elements within the control tube which are directly connected in the electron discharge path of the tube, that is, the cathode 12, the control grid 14, the screen grid 16 and the anode 18 are connected to appropriate sources of operating potential. In the example shown in Fig. 4, the anode is directly connected to the source of anode potential as indicated by the label +200 volts at the top of the voltage divider string including resistors 54, 56 and 58. Resistors 54 and 56 are so proportioned that a relatively fixed screen potential is applied to screen grid 16 while the cathode is connected to the junction between resistors 56 and 54 of the voltage divider arrangement. The resistance of resistor 58 is so determined that a positive potential of 1½ volts with respect to ground is applied to the cathode 12. As indicated by the arrow labelled "to discriminator" the control grid 14 is connected to the discriminator circuit of the receiver through a series resistor 60 and has a shunt condenser 62 connected from grid to ground. Resistor 60 and condenser 62 are so proportioned as to prevent audio voltage peaks from driving the control grid of the tube momentarily to grid current and thus introducing distortion in the audio system. As far as the oscillator tank 51 is concerned, the control tube acts as another trimmer capacitor of negligible loss.

In a typical tube which was constructed and tested, the control characteristic shown in Fig. 3 was obtained, wherein the variation in capacitance in micromicrofarads is plotted as ordinates against variation in control grid potential as abscissae. Curve 64 of Fig. 3 indicates that a minimum capacity of about 4.2 micromicrofarads may be increased smoothly to a maximum of about 9.5 micromicrofarads as the voltage applied to the control tube grid 14 is varied from −2½ volts to zero. The slope of the median part of the range between about −2 volts and −1 volt is about 4.8 micromicrofarads per volt of grid control voltage. It will be seen that the 1½ volts of potential applied to the cathode 12 effectively biases the control grid to the middle of the linear part of the control range shown by curve 64.

Figure 5:
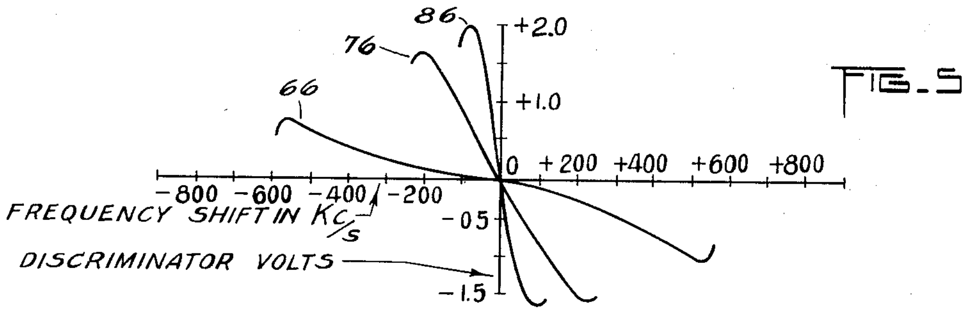
Figure 6:
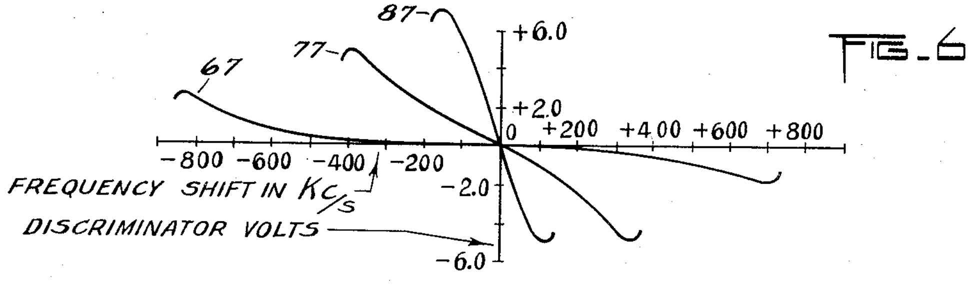
Figure 7:
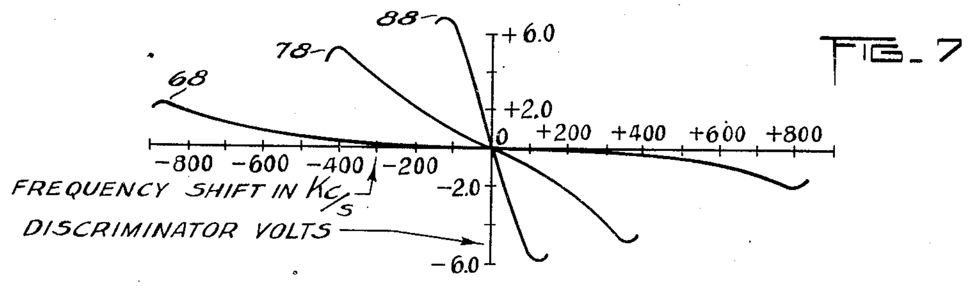

In Figs. 5, 6 and 7 there are shown in curves 66, 67 and 68 the control characteristics of the tube of the present invention for various signal strengths applied to a test receiver. In each of these curves the discriminator voltage of the receiver is plotted as ordinates while the receiver frequency shift in kilocycles is plotted as abscissae. Curves 76, 77 and 78 of Figs. 5, 6 and 7 illustrate the typical performance of a conventional reactance tube circuit arrangement such as known in the prior art for controlling the tuning of the oscillator circuit of the test receiver in response to a variation in the discriminator potential applied to the reactance tube. Curves 86, 87 and 88 illustrate the characteristic control potential derived from the discriminator of the test receiver. The curves in Fig. 5 show the conditions obtained for a signal input of 10 microvolts at 100 megacycles while curves of Figs. 6 and 7 show the response obtained for signal inputs of 50 and 100 microvolts respectively at the same frequency.

Figure 8:
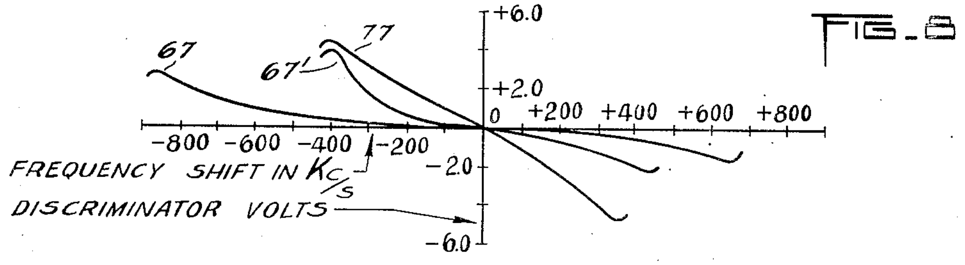

The capacitor 52 of Fig. 4 was, for the curves of Figs. 5, 6 and 7 set at 5 micromicrofarads in order to limit the frequency range over which frequency control is secured to plus or minus 800 kilocycles per second or 4 FM channels. Variation of the capacity of condenser 52 provides a simple means for changing the range of frequency control. This is illustrated in Fig. 8, wherein the abscissae and ordinates are as in the previous figures and curves 67 and 77 are the same as in Fig. 6. Curve 67′ shows the effect of reducing the series capacitor 52 to 2.5 micromicrofarads whereby the control is reduced to a range of plus or minus 400 kilocycles per second. It will, of course, be understood that the frequency range over which control is secured may also be varied by tapping the control tube down on the oscillator circuit either by a tap on the inductance 50 or by providing a capacitive voltage divider in place of tuning capacitor 51. However, the total range of frequency control is eventually determined by the selectivity of the radio frequency amplifier or antenna stage. The oscillator control should be so limited that it will not act to tune in a signal outside of the pass band of the radio frequency amplifier stage or of the antenna stage if a good signal-to-noise ratio and freedom from spurious response are to be obtained.

While we have shown and particularly described an embodiment of the present invention, it should be particularly understood that the present invention is not limited thereto but that modifications within the scope of the invention may be made.

We claim:

1. An electrical control device comprising an envelope, a resilient bimetallic strip in the envelope having one end rigidly mounted and the remainder thereof free to flex and forming an anode, a cathode in the envelope for thermionically heating the bimetallic strip to cause the same to flex about its mounting in proportion to the thermionic heating, a control grid in the envelope for regulating the amount of thermionic heating, a condenser in the envelope including a stator and an armature biased toward the stator and a one-way connection between the bimetallic strip and the armature for moving the armature away from the stator when the bimetallic strip is unheated comprising an insulating rod interposed between said anode and said armature.

2. An electrical control device comprising an envelope, a resilient bimetallic strip in the envelope having one end rigidly mounted and the remainder thereof free to flex and forming an anode, a cathode in the envelope for thermionically heating the bimetallic strip to cause the same to flex about its mounting in proportion to the thermionic heating, a control grid in the envelope for regulating the amount of thermionic heating, a condenser in the envelope including a stator and an armature biased toward the stator and a one-way connection between the bimetallic strip and the armature for moving the armature away from the stator when the bimetallic strip is unheated comprising an insulating rod interposed between said anode and said armature, said rod having a portion extending through said armature and a stationary guide member and a coil spring surrounding said extending portion and providing said bias of the armature toward said stator.

3. An electrical control device including an insulating spacer member having an aperture therethrough, a cathode and a number of grids surrounding said cathode mounted on one side of said insulating member, a bimetallic strip lying against said insulating member and having one end rigidly secured thereto and interposed between said cathode and said insulating member, a condenser including a stator member mounted on the other side of said insulating member and having an aperture therethrough in alignment with the aperture in said insulating member and an armature member having an aperture therethrough in alignment with the apertures in said stator plate and said insulating member, an insulating rod passing through said apertures and having a shoulder portion bearing against said armature member, said insulating rod also passing through a stationary guide member on the side of said condenser remote from said insulating member and a coil spring between said armature member and said stationary guide member for biasing said armature toward said stator.

4. An electrical control device including an insulating spacer member having an aperture therethrough, a cathode and a number of grids surrounding said cathode mounted on one side of said insulating member, a bimetallic strip lying against said insulating member and having one end rigidly secured thereto and interposed between said cathode and said insulating member, a condenser including a stator member mounted on the other side of said insulating member and having an aperture therethrough in alignment with the aperture in said insulating member and an armature member having an aperture therethrough in alignment with the apertures in said stator plate and said insulating member, an insulating rod passing through said apertures and having a shoulder portion bearing against said armature member, said insulating rod also passing through a stationary guide member on the side of said condenser remote from said insulating member and a coil spring between said armature member and said stationary guide member for biasing said armature toward said stator, and a conductive shield member arranged around said cathode and grid members on the sides thereof remote from said bimetallic strip member.

5. An electrical control device including an insulating spacer member having an aperture therethrough, a cathode and a number of grids surrounding said cathode mounted on one side of said insulating member, a bimetallic strip lying against said insulating member and having one end rigidly secured thereto and interposed between said cathode and said insulating member, a condenser including a stator member mounted on the other side of said insulating member and having an aperture therethrough in alignment with the aperture in said insulating member and an armature member having an aperture therethrough in alignment with the apertures in said stator plate and said insulating member, an insulating rod passing through said apertures and having a shoulder portion bearing against said armature member, said insulating rod also passing through a stationary guide member on the side of said condenser remote from said insulating member and a coil spring between said armature member and said stationary guide member for biasing said armature toward said stator, said device also including an envelope having an insulating header base with a number of connection pins extending therethrough, certain of said connection pins extending through said insulating member for connection to said bimetallic strip, cathode and grids and also serving to maintain said insulating member in position, others of said connection pins being connected to said stator member and said armature member.

6. An electrical control device including an insulating spacer member having an aperture therethrough, a cathode and a number of grids surrounding said cathode mounted on one side of said insulating member, a bimetallic strip lying against said insulating member and having one end rigidly secured thereto and interposed between said cathode and said insulating member, a condenser including a stator member mounted on the other side of said insulating member and having an aperture therethrough in alignment with the aperture in said insulating member and an armature member having an aperture therethrough in alignment with the apertures in said stator plate and said insulating member, an insulating rod passing through said apertures and having a shoulder portion bearing against said armature member, said insulating rod also passing through a stationary guide member on the side of said condenser remote from said insulating member and a coil spring between said armature member and said stationary guide member for biasing said armature toward said stator, one of said grid members being adapted to serve as a control electrode and the other being adapted to be connected to a positive source of potential whereby the effect of anode voltage variations is minimized.

7. An electrical control device including an insulating spacer member having an aperture therethrough, a cathode and a number of grids surrounding said cathode mounted on one side of said insulating member, a bimetallic strip lying against said insulating member and having one end rigidly secured thereto and interposed between said cathode and said insulating member, a condenser including a stator member mounted on the other side of said insulating member and having an aperture therethrough in alignment with the aperture in said insulating member and an armature member having an aperture therethrough in alignment with the apertures in said stator plate and said insulating member, an insulating rod passing through said apertures and having a shoulder portion bearing against said armature member, said insulating rod also passing through a stationary guide member on the side of said condenser remote from said insulating member and a coil spring between said armature member and said stationary guide member for biasing said armature toward said stator, and a conductive shield member arranged around said cathode and grid members on the sides thereof remote from said bimetallic strip member, one of said grid members being adapted to serve as a control electrode and the other being adapted to be connected to a positive source of potential whereby the effect of anode voltage variations is minimized.

8. An electrical control device including, within an evacuated envelope, an insulating wafer having an aperture therethrough, a cathode and a number of grids surrounding said cathode mounted adjacent one side of said wafer, a bimetallic strip lying against said insulating member and having one end rigidly secured thereto and interposed between said cathode and said insulating member, a condenser including a stator member mounted along the other side of said wafer and having an aperture therethrough in alignment with the aperture in said insulating member and an armature member having an aperture therethrough in alignment with the apertures in said stator plate and said insulating member, an insulating rod passing through said apertures and having a shoulder portion bearing against said armature member, and a spring pressing against said armature member for biasing said armature toward said stator.

9. An electrical control device comprising an envelope, a resilient bimetallic strip in the envelope having one end rigidly mounted on an insulating wafer and the remainder thereof free to flex and forming an anode, a cathode lying along said anode and spaced therefrom for thermionically heating the bimetallic strip to cause the same to flex about its mounting in proportion to the thermionic heating, a control grid surrounding said cathode for regulating the amount of thermionic heating, a condenser including a stator mounted on said wafer and an armature biased toward the stator and an insulating rod interposed between said bimetallic strip and the armature for moving the armature away from the stator when the bimetallic strip is unheated and guide means supporting said rod for endwise movement.

10. An electrical control device comprising an envelope, a resilient bimetallic strip in the envelope having one end rigidly mounted on an insulating wafer and the remainder thereof free to flex and forming an anode, a cathode lying along said anode and spaced therefrom for thermionically heating the bimetallic strip to cause the same to flex about its mounting in proportion to the thermionic heating, a control grid surrounding said cathode for regulating the amount of thermionic heating, a condenser including a stator mounted on said wafer and an armature biased toward the stator and an insulating rod interposed between said bimetallic strip and the armature for moving the armature away from the stator when the bimetallic strip is unheated and guide means supporting said rod for endwise movement, and a coil spring pressing against said armature to provide said bias of the armature toward said stator.

JAMES V. O'NEILL.
ROGER W. SLINKMAN.

REFERENCES CITED

The following references are of record in the file of this patent:

FOREIGN PATENTS

| Number | Country | Date |
|---|---|---|
| 612,349 | Great Britain | Nov. 11, 1948 |